United States Patent [19]
LeBourgeois

[11] Patent Number: 6,026,166
[45] Date of Patent: *Feb. 15, 2000

[54] DIGITALLY CERTIFYING A USER IDENTITY AND A COMPUTER SYSTEM IN COMBINATION

[75] Inventor: John H. LeBourgeois, Novato, Calif.

[73] Assignee: Cryptoworx Corporation, San Anselmo, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/954,245

[22] Filed: Oct. 20, 1997

[51] Int. Cl.$^7$ ........................................................ H04K 1/00
[52] U.S. Cl. .................................. 380/25; 380/23; 380/47; 380/49; 713/155; 713/156; 713/169; 713/176
[58] Field of Search .......................................... 380/25, 23

[56] References Cited

U.S. PATENT DOCUMENTS

| | | | |
|---|---|---|---|
| 5,721,780 | 2/1998 | Ensor et al. | 380/25 |
| 5,774,550 | 6/1998 | Brinkmeyer et al. | 380/21 |
| 5,796,840 | 8/1998 | Davis | 380/50 |

OTHER PUBLICATIONS

Ellison, Carl M., "Establishing Identity Without Certification Authorities", World Wide Web page, URL=http://www.clark.net/pub/cme/usenix.html, visited Oct. 20, 1997.

Ellison, Carl M., "Simple Public Key Certificate", World Wide Web page, URL=http://www.clark.net/pub/cme/spki.txt, visited Oct. 20, 1997.

Ellison, Carl M., "Generalized Certificates", World Wide Web page, URL=http://www.clark.net/pub/cme/html/cert.html, visited Oct. 20, 1997.

Rivest, Ronald L., et al., "SDSI—A Simple Distributed Security Infrastructure", World Wide Web page, URL= http://theory.lcs.mit.edu/~rivest/sdsi10.html, visited Oct. 20, 1997.

"What Is" online encyclopedia, definition for "digital cash", World Wide Web page, URL=http://whatis.com/digital-c.htm, visited Oct. 20, 1997.

"What Is" online encyclopedia, definition for "SET (Secure Electronic Transactions)", World Wide Web page, URL= http://whatis.com/set.htm, visited Oct. 20, 1997.

RSA Laboratories, Inc., "Question 123. What are Certificates?", World Wide Web page, URL=http://www.rsa.com/rsalabs/newfaq/q123.html, visited Oct. 20, 1997.

RSA Laboratories, Inc., "Question 129. What are Certificate Revocation Lists (CRLs)?", World Wide Web page, URL= http://://www.rsa.com/rsalabs/newfaq/q129.html, visited Oct. 20, 1997.

VeriSign, Inc., Digital ID Center, "Frequently Asked Questions", World Wide Web page, URL=http://digitalid.verisign..com/id faqs.htm, visited Oct. 20, 1997.

*Primary Examiner*—Tod R. Swann
*Assistant Examiner*—Paul E. Callahan
*Attorney, Agent, or Firm*—Fliesler Dubb Meyer & Lovejoy LLP

[57] ABSTRACT

Digital certification method in which a first digital signature dependent upon a first user identity and a first user system in combination, is stored accessibly to a certification server. The first user identity can be distinguished by, for example, a PIN provided by the user. Subsequently, the user system generates a second signature dependent upon both the current user identity and the current user system in combination. The certifying system then compares the second signature with the first, as stored, to certify the transaction. The certification can accommodate normal computer system component drift. An inquiring system, desiring to confirm the identity of a user, issues a challenge code to the user system. The user system then digests the user's PIN, individual component signatures as they currently exist on the user's system, together with the challenge code to generate the new signature. The new signature is transmitted back to the inquiring system, which transmits it on to the certification server together with the challenge code. The certification server then digests the challenge code with the original signature as previously stored, and compares the result to the newly provided signature to confirm the users identity, else drift criteria can be applied if desired.

38 Claims, 11 Drawing Sheets

DIGITALLY CERTIFYING A USER IDENTITY AND A COMPUTER SYSTEM IN COMBINATION

BACKGROUND OF THE INVENTION

1. Field of the Invention

The invention relates to digital certification techniques and, more particularly, to a technique for certifying a user identity and computer system in combination.

2. Description of Related Art

Digital commerce on the Internet requires the ability to digitally "sign" messages, providing a level of assurance that the purported sender of the message is in-fact the true sender of the message. Commonly, a digital signature is created by encrypting a digest of the message with the sender's private key. In order to verify authorship, the recipient of the message decrypts the digital signature using the public key of the purported sender to recover the original digest, and compares the result to the recipient's own digest of the message as received.

The reliability of the signature verification depends on the reliability of the recipient's copy of the sender's public key. Often the sender transmits such a copy of his or her public key along with the original message, as a courtesy. Therefore, one possible way of subverting the digital signature technique is that an impostor might create a message purportedly from the original sender, and encrypt a digest of the message according to a different private key. The impostor would then send the message on to the recipient with the new encrypted digest and with the public key corresponding to the impostor's private key. Assuming the recipient relies on the public key received with the message in order to verify the authenticity of the message, then the recipient's verification that the message originated from the original sender will be false.

One known method for preventing this kind of subversion involves the use of digital certificates, for example as set forth in International Telecommunication Union, "Recommendation X.509—Information Technology—Open Systems Interconnection—the Directory: Authentication Framework" November 1993 ("Recommendation X.509"), incorporated herein by reference. According to this standard, the sender transmits the original message and encrypted digest in conjunction with a digital certificate. To create the certificate, the sender passes the sender's public key through the message digesting algorithm to form a digest for the sender's public key, which is then encrypted by a third party certifier using the certifier's private key to form an encrypted digest of the sender's public key. The certifier may be any third party who is trusted by the recipient to not be subject to subversion by the impostor. The sender then transmits to the recipient the original desired message, the encrypted digest for the original message, and the certificate (including the sender's public key and the encrypted digest of the sender's public key). As with the non-certificated transmission, the sender may include the certifier's public key as part of the certificate.

In order to verify the authenticity of the message, the recipient uses the sender's public key, from the certificate, to verify the authenticity of the message itself in the manner described above. The recipient also uses the certifier's public key to verify the authenticity of the encrypted digest in the certificate of the sender's public key.

But a certification scheme is also subject to subversion in the same manner as the non-certificated scheme if the recipient still must rely on the validity of the certifier's public key as provided in the certificate to determine the authenticity of the certificate itself. The X.509 scheme, therefore, envisions a hierarchy of certifying authorities, each certifying the public key of one or more other certifying authorities, until a certification chain is created from the original sender of the message up to some universally trusted certifying authority (referred to as the Root Authority (RA)).

The X.509 standard for signing messages suffers from a number of drawbacks, not the least of which is that no universally trusted RA currently exists. A number of different entities aspire to that role, but none is currently universally accepted. The necessary hierarchy of certifying authorities is not currently in place. Another deficiency involves the complexity of the certification and verification process which involve multiple layers of certifications. In addition, even if the hierarchy of certifying authorities were in place, and the RA were accepted as trustworthy, the X.509 standard still may not reliably bind a digital signature to an individual. Rather, binding is based only on the preponderance of the evidence that at some time in the past, the signer was in fact the individual that he or she purported to be.

Another deficiency with the X.509 standard is that, as proposed, every validation by a certifying authority is likely to incur a fee. Another problem is that the X.509 scheme depends on users abiding by certain policies and constraints promulgated in the various certifying hierarchies, such as expiration dates and certificate revocations. Moreover, the policies and constraints promulgated in different hierarchies can be different. A number of other deficiencies also exist in the X.509 scheme.

Different kinds of transactions require different degrees of confidence in the validity of a digital signature. For example, whereas large dollar amount transactions, stock trading, weapons release, and so on might require a high level of confidence, smaller transactions might not require such a high level of confidence. Very small cash transactions or non-transaction communications might not require very much confidence at all in the validity of the digital signature. For communications and transactions not requiring the highest level of confidence in the digital signature, an alternative to the X.509 hierarchical model exists. This alternative, known as Pretty Good Privacy (PGP), proposes a diffuse network model, where networks of people "sign" a given user's public key on a public key server. Public keys thereby gradually accumulate sufficient "mass" to vouch for the identity of the owner of the public key. The PGP scheme avoids some of the problems with the X.509 standard, but lacks any means for accountability. Thus, of the two primary conventional cryptographic techniques for binding the sender of a message with an identity, one is unwieldy and requires an infrastructure that is not currently in place, and the other is not sufficiently binding or accountable to be used in high-risk transactions.

Certain classes of transactions exist which do not require the binding of the sender of a message with an individual. For example, authorization transactions do not require that the individual requesting authorization be identifiable by the authority of which authorization is being requested. The identity of the individual may be, for example, on file at a bank. What is important for these transactions is that the identity of the user be consistent, not that the individual be known. For the use of an automated teller machine, for example, the user need only enter an account number and PIN (personal identification number). The identity of the individual is not transmitted for the authorization transaction; only a representation, in the form of the user's PIN and the number recorded on the ATM card is transmitted. Authorization certifications usually have only a one-tier hierarchy, such as where a bank or credit card company previously issued the user an I.D. on the basis of the user's account with the bank or credit card company. They usually do not rely on a chain of certifying authorities to validate the user. One-tier authorization certification thereby avoids any need for a hierarchy infrastructure as in the X.509 standard. By foregoing the necessity of a binding between a user and a known individual, these systems also avoid any need for a sufficient mass of signers on a public key server to vouch for the identity of the user, as in the PGP scheme.

In U.S. patent application SC/Ser. No. 08/818,132, filed Mar. 14, 1997, entitled "DIGITAL PRODUCT RIGHTS MANAGEMENT TECHNIQUE", by inventor John H. LeBourgeois, incorporated herein by reference in its entirety, an enhanced authorization mechanism is described which binds an authorization requester to a particular computer system, for example, rather than to a particular individual. Such a mechanism is useful, for example, for ensuring that digital products, such as software, music, images and so on, be authorized for use only on a single computer. Anonymity (privacy) of the individual user can be maintained. As set forth in the above-incorporated patent application, a "reader system signature" is developed at the time the product is to be used on the reader system, based on identifying information of certain hardware or software components then on the system. The reader system is able to make use of the digital product only if the proper system signature exists. A certain amount of flexibility is built into the process, because if validation at the time of use fails, a revalidation process takes place whereby a license server determines, in a sense, "how different" the reader system is currently as compared to its configuration at the time of the original authorization. If the reader system as it is currently configured satisfies certain predetermined "drift" criteria, then reauthorization is automatic; otherwise reauthorization is made manually. Thus the technique described in the above-incorporated patent application permits flexible authorization-type certification with only a single level of hierarchy and while preserving the privacy of individual users.

SUMMARY OF THE INVENTION

The present invention permits the binding of a user identity (virtual or physical) with an authorization request. This binding is reliable enough to be used in relatively high-risk transactions, and can be made reliable enough to be used in the highest-risk transactions. An embodiment of the invention optionally can make use of some of the system signature technology described in the above-incorporated patent application.

According to the invention, roughly described, a first signature dependent upon a first user identity and a first user system in combination, is stored accessibly to a certification server. The first user identity can be, for example, a PIN provided by the user. Subsequently, at a second time when the user desires authorization to complete a transaction, the user system generates a second signature dependent upon both the current user identity and the current user system in combination. The certifying system then compares the second signature with the first, as stored, in order to determine whether to certify the transaction. The certification can accommodate normal computer system component drift, for example in the manner described in the above-incorporated patent application.

It will be appreciated that such a method minimizes the risk of a stolen PIN, because the PIN is useless without the computer system hardware on which the first user identity was originally established. The technique also minimizes the risk of subversion through the theft of the first user's computer hardware because, again, the transaction will not be authorized without the user's PIN.

In an aspect of the invention, the mechanism can also provide a level of confidence that the second signature, provided to the certification server at the time that authorization is requested, truly was generated based on the user's system components as it existed at the time that the authorization is requested, rather than being merely a copy of a signature stored previously. In an embodiment, after the user issues an authorization request to a merchant system, for example, the merchant system issues a challenge code back to the user system The user system then digests the user's PIN, individual component signatures as they currently exist on the user's system, together with the challenge code to generate the new signature. The new signature is transmitted back to the merchant server, which transmits it on to the certification server together with the challenge code. The certification server then digests the challenge code with the original first signature as previously stored, and compares the result to the newly provided signature. If they match, then the transaction is authorized. If not, then drift criteria can be applied if desired.

The mechanism according to the invention has a number of advantages over other authorization certification techniques. For example, the certification by nature is limited in time, since ordinary hardware drift or new computer hardware would invalidate previous certifications allowing new certifications to be generated. As another example, validation of the first user identity is self-certifying; if the digest of the user's system is not correct, the certification fails automatically. This allows minimization of transaction costs and greater security for on-line validation. As another example, the certification may be ported to a smart card, with an appropriate code indicating smart card usage and an expiration time stamp. Furthermore, identity cannot be loaned to another person without the other person being present on the hardware. For the same reason, nor can a user identity be stolen and transmitted through the Internet. The ability for self-certification is present as well, leveling the entire X.509 hierarchy, as the single certification authority can substantially rely on the uniqueness of the certificate presented binding the individual to the user system. Certifications can now be generated in two versions: anonymous and publicly bound. Moreover, individuals can generate a number of different virtual user identities, simply by using different PINs for each identity. This improves anonymity in transactions and communications. Finally, for cases where the physical identity of a user must be bound to a machine instance, external validation of identity can bind the person to the hardware certification, with much more confidence and less risk than currently exists in the conventional proposed systems.

BRIEF DESCRIPTION OF THE DRAWINGS

The invention will be described with respect to particular embodiments thereof, and reference will be made to the drawings, in which.

DETAILED DESCRIPTION

Figure 1:
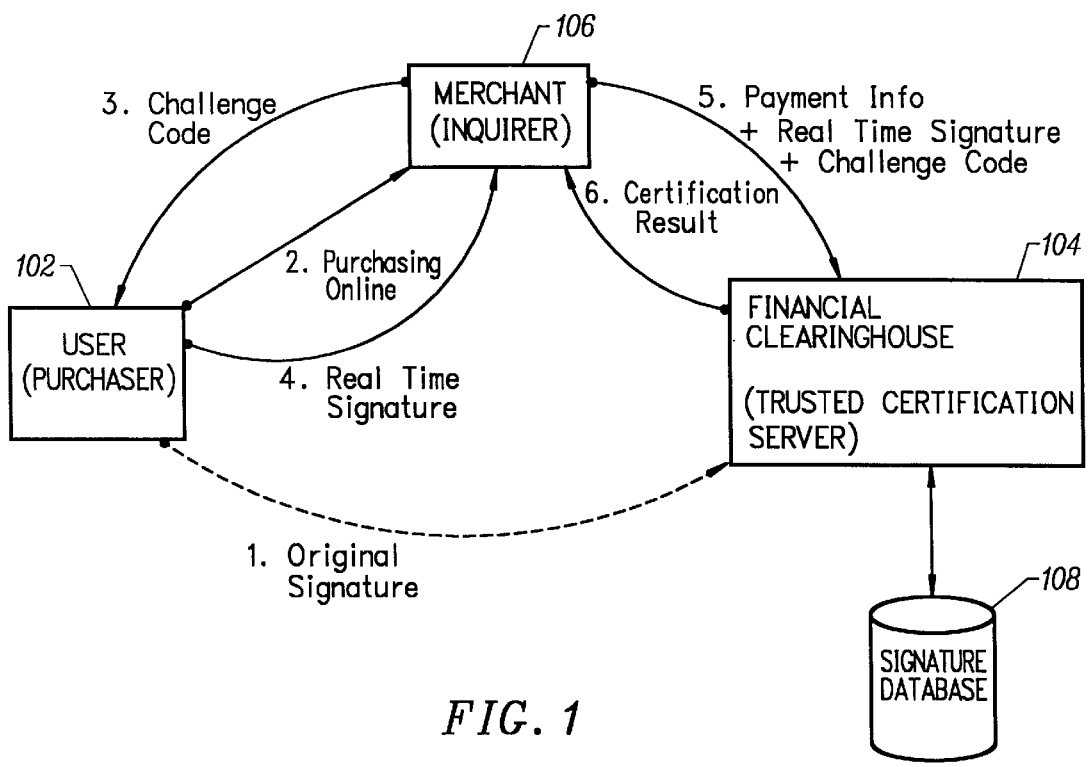
FIG. 1 is an overall symbolic diagram of an arrangement according to the invention.

FIG. 1 is an overall symbolic diagram of an arrangement according to the invention. The arrangement has three primary components: a user system 102, a financial clearinghouse system 104 and a system referred to herein as an inquirer system 106. The financial clearinghouse system 104 can be any certification server trusted by the inquirer 106, such as a bank, a credit card company, or a third party certifying authority. The inquirer system 106 can be any entity that wishes to verify with the financial clearinghouse 104 the identity of a user. In the embodiment described herein, the inquirer 106 might be, for example, an on-line merchant server system. In conformity with this paradigm, the user 102 might be a person interested in purchasing goods or services from the merchant 106. In addition to the above, the financial clearinghouse 104 maintains a signature database 108, containing digital signatures of the various accounts held by users of the financial clearinghouse 104.

In general operation, a user opens up an account with the financial clearinghouse 104, and provides a digital signature to the clearinghouse 104 for storage on the signature database 108. As described in more detail hereinafter, the digital signature depends upon both the user and the user's system 102. At a subsequent time, when the user wishes to purchase merchandise from the merchant 106, the user system 102 regenerates the signature in real time, including both the portions which depend upon the user and the portions which depend upon the user's system. The newly generated signature is provided to the financial clearinghouse, which processes it in relation to the digital signature originally stored on the signature database 108 to determine whether the real timegenerated signature is valid.

In FIG. 1, the user system 102, the certification server 104 and the inquirer system 106 are each illustrated as a respective individual block. Depending on the embodiment, each block might contain no more than a single computer, or in different embodiments, different blocks can contain more than one computer. In one embodiment, one or more of the blocks 102, 104 and 106, for example the certification server 104, contains a number of computers spread out over a great geographical area and interconnected by a network. The illustration of the user system 102, the certification server 104, and the inquirer system 106 as single blocks is not intended to indicate that each must constitute only a single computer system or that each must be located at a respective single location.

Figure 2:
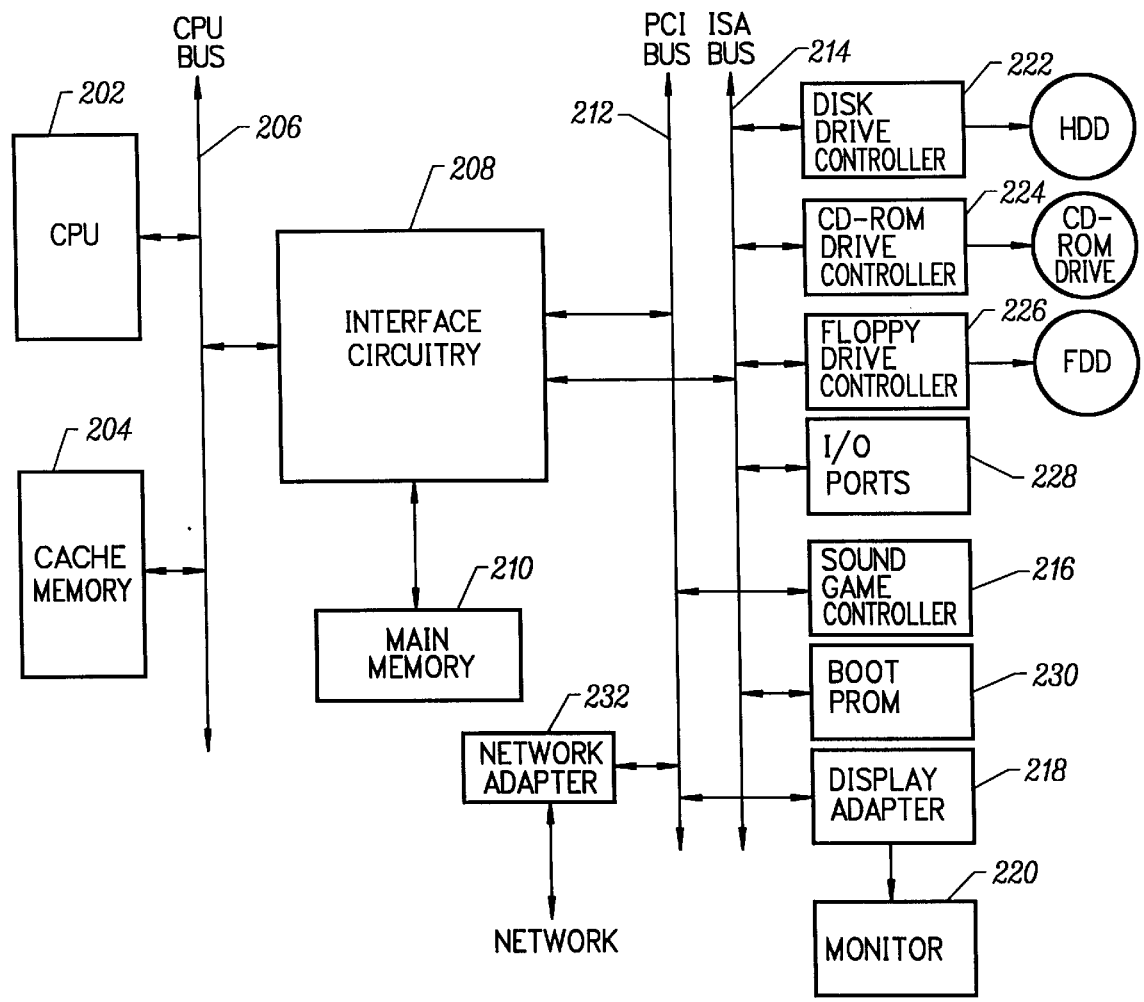
FIG. 2 is a symbolic block diagram illustrating the structure of a typical computer system which may be used as a user system, an inquirer system or a certification server.

Nor is there any requirement that computers used to form the user system 102, the certification server 104, and the inquirer system 106 have any particular structure. FIG. 2 is a symbolic block diagram illustrating the structure of a typical computer system which may be used as a user system, an inquirer system or a certification server It comprises a CPU 202 and cache memory 204, both connected to a CPU bus 206. Interface circuitry 208 is also connected to the CPU bus 206. The interface circuitry 208 is further connected to a main memory 210, as well as to two I/O buses: PCI-bus 212 and ISA-bus 214. Connected to the PCI-bus 212 are sound and game controllers 216, a network adapter 232 and a display adapter 218, the last of which is further connected to a monitor 220. Connected to the ISA-bus 214 is a hard disk drive controller 222, a CD-ROM drive controller 224, a floppy disk drive controller 226, various I/O ports 228, and a boot PROM 230. Most of the peripheral components illustrated in FIG. 2 include on-board configuration data which can be read by the CPU 202. In addition, the boot PROM 230 includes a portion which is writeable by the CPU 202 to store configuration data. In general, the software to operate the user system 102, the certification server 104 or the inquirer system 106 is stored on the disk drive controlled by the disk drive controller 222, and brought into main memory 210 as needed for execution. The computer system of FIG. 2 communicates with the other systems of FIG. 1 via the network adapter 232.

Figure 3A:
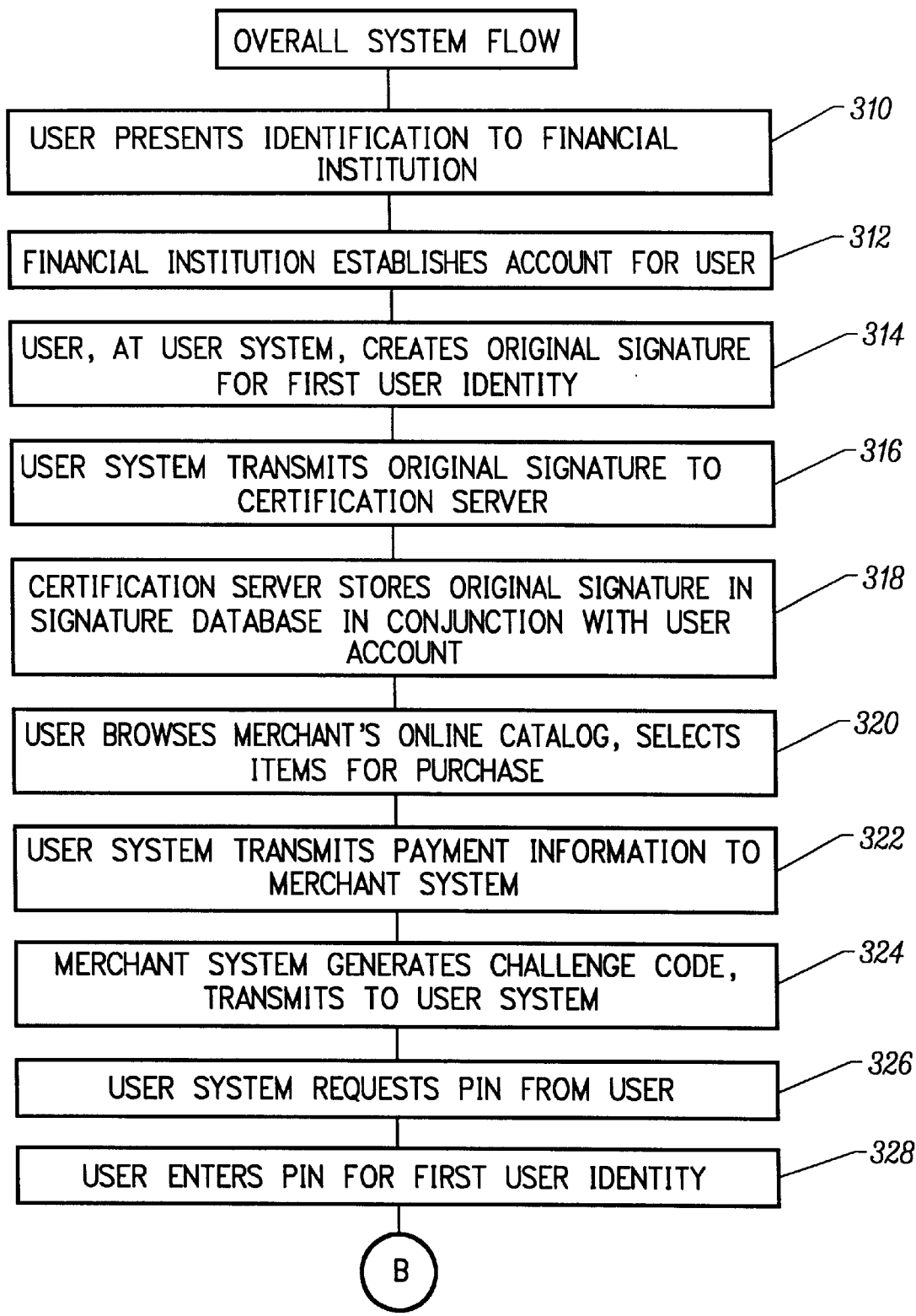
FIGS. 3A and 3B in combination are a flow chart illustrating the overall system flow for the embodiment of FIG. 1.
Figure 3B:
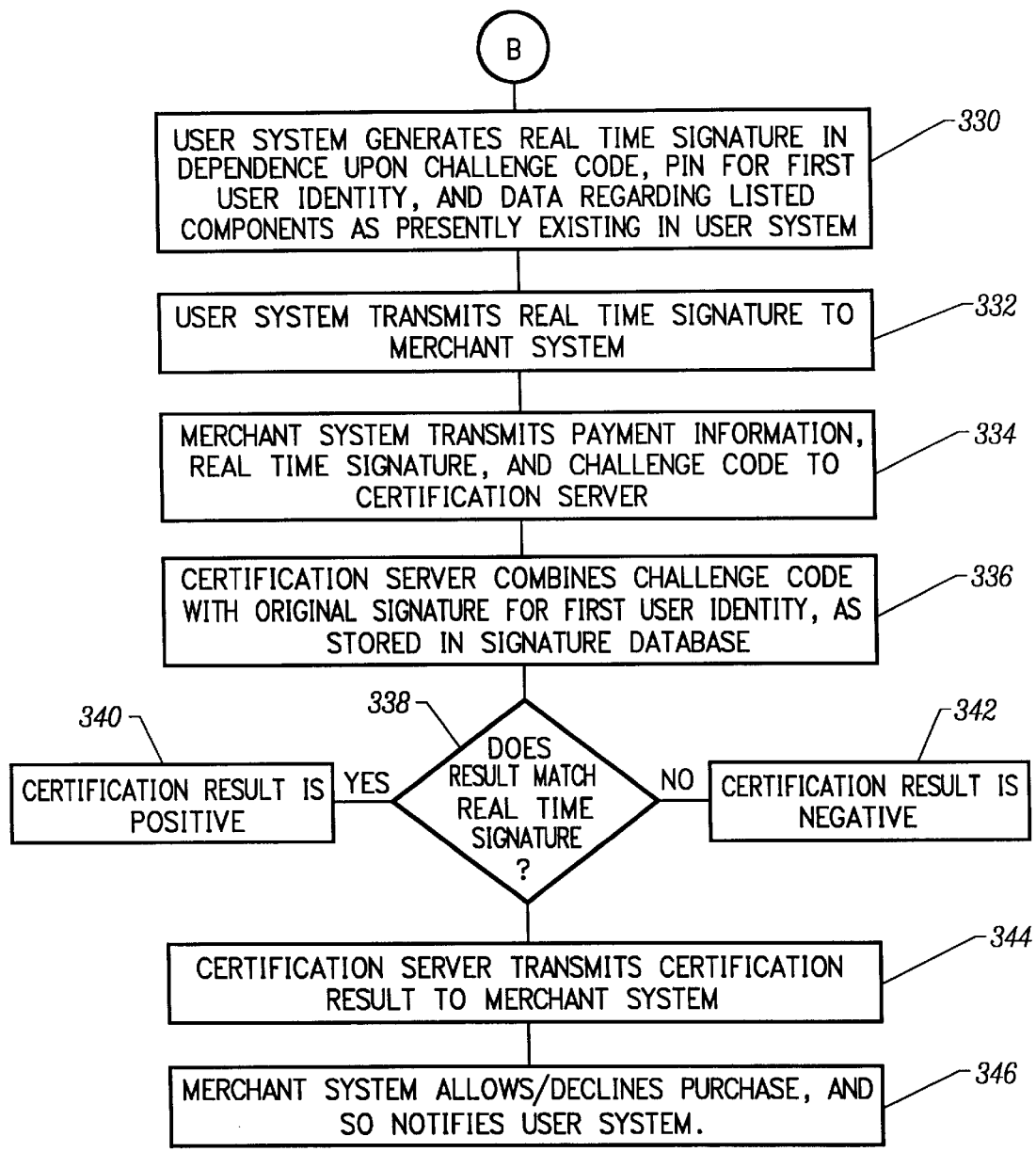

FIGS. 3A and 3B in combination are a flow chart illustrating the overall system flow for the embodiment of FIG. 1. The flow chart of FIG. 3A continues in FIG. 3B, as indicated by the circled symbol "B" in both figures.

Referring to FIG. 3A, in a step 310, prior to any purchasing transaction, the user presents his or her identification to the financial clearinghouse or other financial institution which stands behind the certification server 104. Depending on the level of confidence that the financial institution requires in the physical identity of the user, the required identification might be as strict as a biometric measurement, such as fingerprints or a retinal scan, or it may be somewhat less stringent, such as by requiring notarization, a photo I.D., or other mechanism involving some physical presence. In a situation where the financial institution does not need to know the physical identity at all, for example where the financial institution is merely going to be maintaining a debit account and is taking no risk of its own, step 310 can be omitted. For a debit account, the financial institution is concerned only that the user identity be consistent in future transactions, not that the user identity actually be known; it is not necessary to bind the user identity with a physical identity.

In a step 312, the financial institution establishes an account for the user. This may involve depositing some money into a debit account, or it may involve merely creating a record of the user in a database.

In step 314, the user, at the user system 102, creates an original signature for a first user identity in a manner described in more detail hereinafter. The digital signature created in step 314 depends upon both the user system 102 as well as the user's first identity (the user can have more than one virtual identity, if desired).

In a step 316, the user system 102 transmits the original digital signature to the certification server 104 which, in step 318, stores the original digital signature in the signature database 108 in conjunction with the user account.

Some time later, in a step 320, the user browses an on-line catalog, for example, maintained by the merchant system 106, and selects items for purchase. In step 322, the user system 102 transmits the user's payment information to the merchant system 106. Such payment information might include credit card information, or a reference to a debit account previously established at the financial clearinghouse 104. Before authorizing the transaction, the merchant system 106 will first desire certification that the user is in fact the owner of the credit card or debit account.

Accordingly, in a step 324, the merchant system 106 generates a challenge code and transmits it to the user system 102. The challenge code serves as an inquiry to the user system 102 to provide information so that the merchant can verify the identity of the user. The challenge code preferably is generated randomly, but complete randomness is not actually required. The challenge code is also preferably generated just prior to transmission to the user system 102, but in other embodiments, it may have been generated earlier. It will be seen from the further description below that the issuance of a challenge code helps to ensure that the real time digital signature that will next be generated by the user system 102, truly was generated in real time, and is not merely a surreptitious copy of a digital signature previously stored on the user system 102. Different embodiments of the arrangement of FIG. 1 might require different levels of confidence in the currency of the real timegenerated digital signature, and therefore might permit different freedoms in the randomness of the merchant's challenge code or in the currency of generation of the merchant's challenge code.

In a step 326, after the user system 102 receives the challenge code from the merchant system 106, the user system requests a user identity code (e.g., a PIN) from the user. In step 328, the user enters the PIN for his or her first user identity.

In step 330 (FIG. 3B), the user system 102 generates a real time digital signature, in dependence upon the challenge code, the PIN entered with the first user identity, and certain data regarding certain listed components as presently existing in the user system 102. The generation of the real time digital signature in step 330 is described in more detail below.

In step 332, the user system 102 transmits the real time digital signature to the merchant system, which in step 334 further transmits it on to the certification server 104 together with the challenge code and the user's payment information previously supplied. In step 336, the certification server 104 combines the challenge code with the original signature for the first user identity, as stored in the signature database 108, and determines, in step 338, whether the result matches the real time digital signature provided by the user system 102 via the merchant system 106. If the two results match, then the certification result is positive (step 340). If they differ, then the certification result is negative (step 342).

In step 344, the certification server 104 transmits the certification result back to the merchant system 106 which, in step 346, either allows or declines the purchases desired by the user.

Note that any or all of the communications called for in FIG. 1 can be encrypted, digitally signed and/or certified if desired in a given embodiment, although to some extent these precautions might mitigate the advantages obtained by the invention over prior certification mechanisms. By avoiding these precautions, certain requirements of current U.S. export laws can be avoided as well.

As mentioned above, the original digital signature generated by the user system 102 depends upon both the user system 102 itself, as well as a user identity. The user identity may be indicated by, for example, a code or PIN entered by the user via the keyboard. Alternatively, it might be more secure, for example, by a fingerprint or a retinal scan taken by the user system 102 of the user.

The portion of the original digital signature which identifies the user system 102 itself, referred to herein as a user system signature (USS), can be generated in a number of different ways in different embodiments. One embodiment takes advantage of serial numbers or other identifying data which may be present in the user system, and which carry external assurances of substantial uniqueness. That is, many computers when manufactured are assigned a serial number or other indicator which the manufacturer of the computer, or some other authority, guarantees to be unique. For example, Apple MacIntosh computers, when manufactured, are assigned an Ethernet address which is unique to that specific computer. Alternatively, the identifier can be assigned in software, such as in the operating system of the computer. It is not essential that whatever authority assigns the serial number guarantee uniqueness; depending on the level of confidence required by the merchant or the financial clearinghouse, it may be sufficient only that it be extremely unlikely that two computer systems which can act as user systems 102 carry the same identifier. This is the case where, for example, the number carries external assurances of substantial uniqueness, such as in the case of Ethernet addresses.

In another embodiment, the user system signature does not rely on a component having an identifier that carries external assurances of substantial uniqueness. Instead, a plurality of components (hardware or software) are examined to determine individual component signatures. The individual component signatures are then combined to form the overall user system signature, or all of the individual component data is digested together in a single pass. In one embodiment, the individual component signatures are all concatenated together in a predetermined sequence to form the overall user system signature. The individual component signatures may be digested prior to concatenation in order to limit their size to the predefined field size. In another embodiment, optionally after digesting, the individual component signatures are averaged or summed together to form the overall user system signature. The individual component signatures can be weighted prior to combination, in order to reduce the impact on the user system signature that would result from changes in components that are more frequently subject to upgrade or replacement.

In one embodiment, the user system 102 generates the user system signature in dependence upon component signatures from the following components, to the extent present in the system. Except as indicated below, most of the component signatures set forth in this list are readable either from the CMOS or from a configuration manager driver. For PCI or EISA systems, the data can be read from the PCI or EISA board BIOS. The following is only an illustrative list; other embodiments can refer to other components not on this list. In addition, different embodiments may or may not include components which are readily removable by the user.

Hard Disk Drive
   drive I.D.
   numbers of cylinders, sectors and heads
   drive defective sector map (obtained from sector 0)
   drive name
   drive manufacturer
   volume name
Floppy Disk Controller
   I/O addresses and settings
   interrupt assignments
   manufacturer name
Monitor
   monitor name
   monitor type Display Adaptor
  device name
  on-board memory
Mother Board
  CPU type
  CPU speed
  total memory present
  total cache present
  cache timings (measured empirically)
Ports
  I/O addresses and settings
  interrupt assignments
Sound, Video and Game Controllers
  device name
  driver name
  driver version
System Devices
  CMOS profile The kinds of identifying data that might be used to generate the individual component signatures can include the manufacturer name, revision number, versionnumber, date, release number, and so on.

In yet another embodiment, a combination of individual component signatures also includes one or more component signatures that carry external assurances of substantial uniqueness, to the extent such a component exists in the machine.

Figure 4:
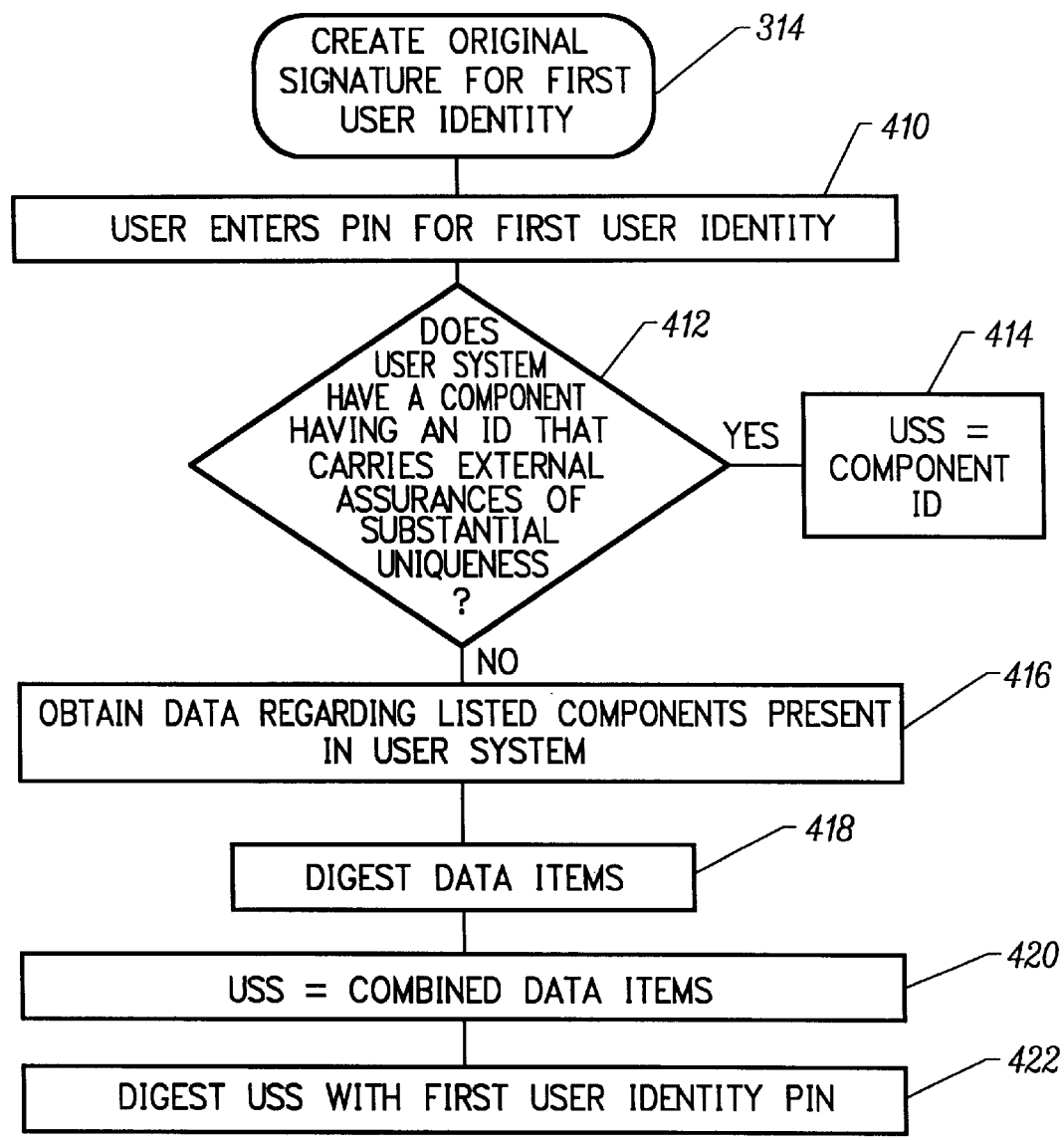
FIG. 4 is a flow chart detail of step 314 in FIG. 3A.

FIG. 4 is a flow chart detail of step 314 in FIG. 3A, within which the user system creates the original digital signature for the first user identity. In a step 410, the user enters his or her PIN for the first user identity. As mentioned, other forms of identification might be used in different embodiments. In step 412, the user system 102 determines whether it has a component which bears an I.D. that carries external assurances of substantial uniqueness. If so, then in step 414, the USS is set equal to that component I.D. In step 416, if the user system 102 does not have a component bearing an I.D. that carries external assurances of substantial uniqueness, or if the embodiment does not utilize such component I.D.s, the user system 102 obtains data regarding each of the listed components as they then exist in the user system 102. In a step 418, the user system 102 digests the different data items and, in step 420, combines the digested data items to form the USS. Any suitable digesting algorithm can be used for the purpose of the digesting step 418 including, for example, an error-correcting code (ECC) generator or the well-known SHA-1 algorithm. The SHA-1 digesting algorithm is described National Institute of Standards and Technology (NIST) FIPS Publication 180: Secure Hash Standard (SHS) (May 1993), as amended by National Institute of Standards and Technology (NIST) Announcement of Weakness in the Secure Hash Standard (May 1994), both incorporated herein by reference. Note that in a different embodiment, the data from the individual components can be combined (e.g., summed, averaged, concatenated together, etc.) without digesting, and only the combined version is digested.

In step 422, the user system 102 combines the USS either from step 420 or from step 414, with the first user identity PIN as entered in step 410, and digests the results again. Again, "combining" can include adding or concatenating the PIN with the USS, or even XOR-ing the PIN with the USS. Note that in a different embodiment, the PIN can be combined with the individual data items earlier in the process of FIG. 4, resulting in only a single digesting step.

Figure 5:
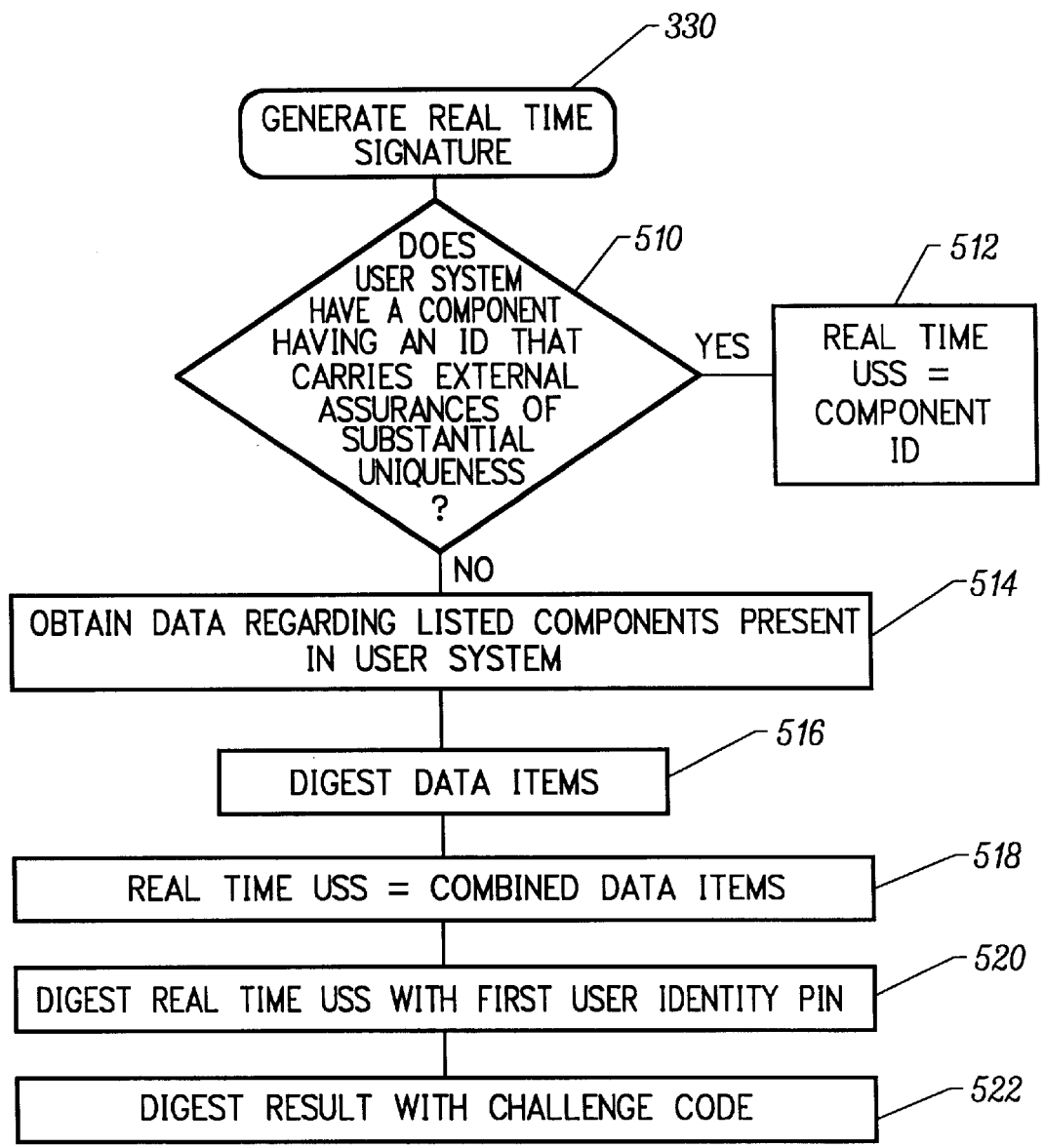
FIG. 5 is a flow chart detail of step 330 in FIG. 3B.

FIG. 5 is a flow chart detail of step 330 (FIG. 3B) in which the user system generates the real time signature in dependence upon the challenge code, the PIN for the first user identity, and data regarding listed components as presently existing in the user system 102. The term "real time", as used herein, does not require absolute currency. The term should be interpreted loosely enough to include digital signatures generated recently, but certainly more recently than the time that the original digital signature was generated. For example, instead of the USS/PIN combination being calculated only in response to an inquiry from an inquiring system, an embodiment might request the user's PIN and generate the "real time" USS/PIN combination on system boot. Another embodiment might request the user's PIN and generate the "real time" USS/PIN combination at the beginning of the user's online session, for example when the user's browser software begins executing. Another embodiment might request the user's PIN and generate the "real time" USS/PIN combination only in response to an inquiry, but might then cache it for some period of time thereafter.

Referring to FIG. 5, in step 510, the user system 102 determines whether it has a component bearing an I.D. that carries external assurances of substantial uniqueness. If so, then a real time USS is set equal to such component I.D. (Step 512) If not, or if the embodiment does not utilize components bearing an I.D. that carries external assurances of substantial uniqueness, then in step 514, the user system 102 obtains, in real time, data regarding the listed components as presently existing in the user system 102. In step 516, as in step 418 in the flow chart of FIG. 4, the data items are digested and, in step 518, a real time USS is generated by combining the digested data items. The real time USS is then further digested in step 520 with the PIN entered in step 328 (FIG. 3A) for the first user identity. As with the flow chart of FIG. 4, the combining and digesting steps can be performed with various algorithms in different embodiments. However, the algorithms chosen should be such that the signature, as it exists prior to step 522, should be the same as the original digital signature generated in the procedure of FIG. 4, given identical PINs and identical user system components.

In step 522, the result of step 520 is further combined with the challenge code and digested to produce the real time digital signature that will subsequently be provided to the merchant system 106 in step 332 (FIG. 3B).

It can be seen that the real time digital signature must, in fact, be generated in real time (as that term is used herein) if it is to incorporate the challenge code provided by the merchant system 106. The reliability of the real time signature in assuring that the user system 102 on which it is generated is in fact the same as the user system 102 on which the original digital signature was generated, can be compromised if the user system 102 stores the USS locally in a form that can be pilfered. This risk is minimized, as previously mentioned, by further requiring the user to enter his or her PIN and digesting it together with the USS. The user can still compromise the reliability of the real time digital signature by storing his or her PIN locally on the user system 102, or by storing the original digital signature itself locally on the user system 102, but this is not an advisable procedure. The risk to the merchant 106 or the financial clearinghouse 104 of such a procedure can be minimized, for example by contractually requiring the user to maintain better security procedures, or by contractually assigning liability to the user for any increased risk resulting from inadequate PIN security.

Figure 6:
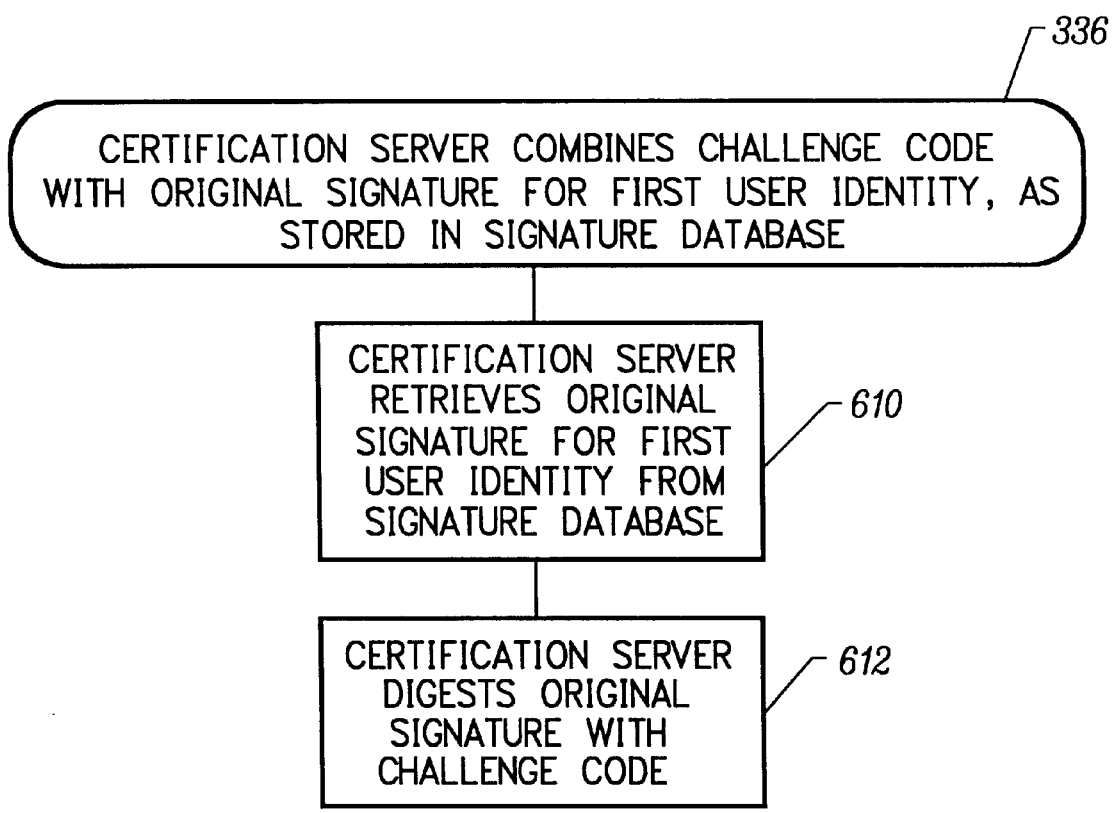
FIG. 6 is a detail of step 336 in FIG. 3B.

FIG. 6 is a detail of step 336 (FIG. 3B), in which the certification server 104 combines the challenge code with the original signature for the first user identity, as stored in the signature database 108. In step 610, in response to receipt of the information from the merchant system 106, the certification server retrieves the original signature for the first user identity from the signature database 108. In step 612, the certification server combines the original signature with the challenge code provided by the merchant system 106 and digests them together in the same manner as performed in step 522 (FIG. 5).

Figure 7:
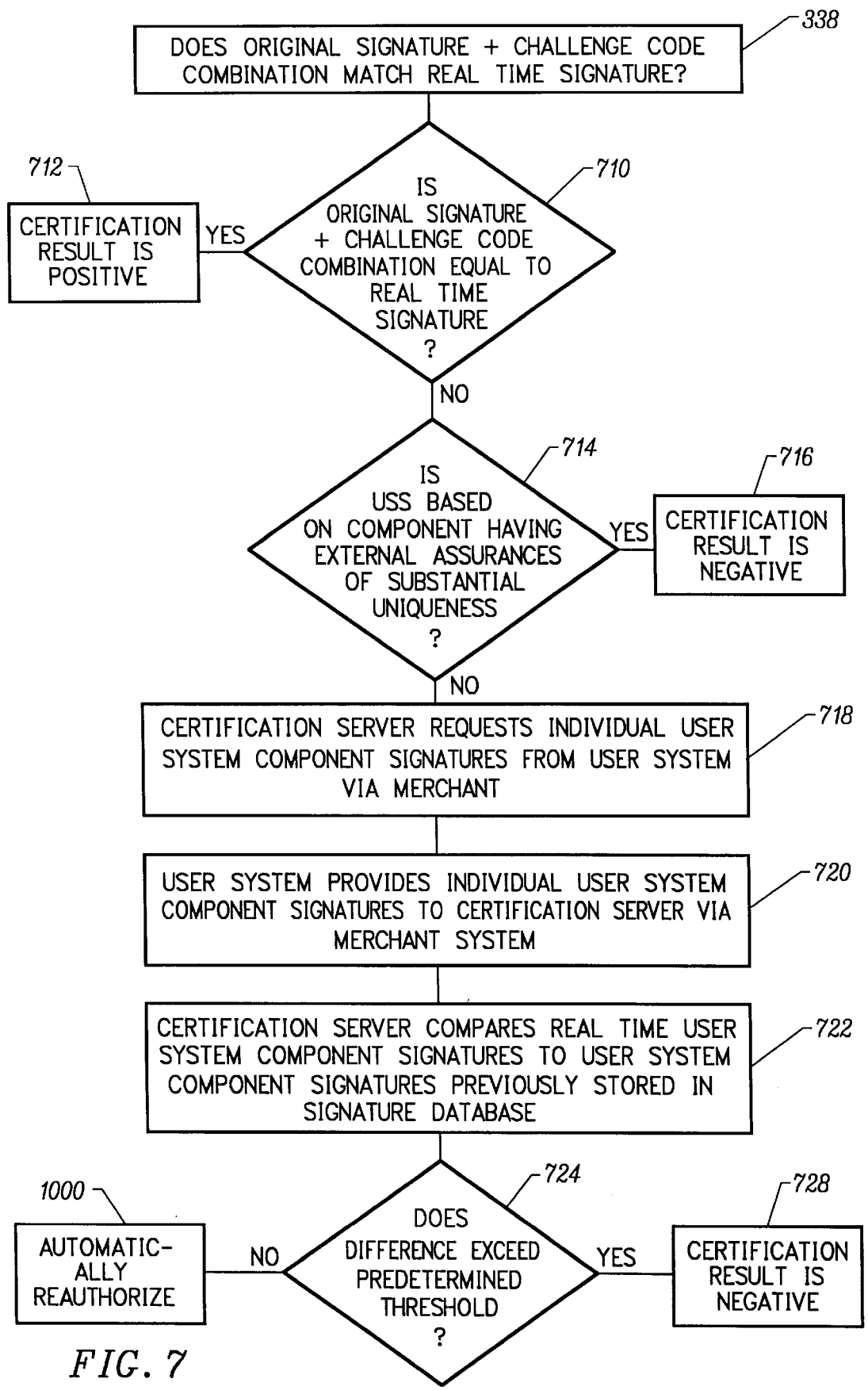
FIG. 7 is a detail of the decision step 338 in FIG. 3B.

As previously discussed, in step 338 (FIG. 3B), if the original digital signature as combined (by the certification server 104) with the challenge code provided by the merchant system 106, does not match the real time signature provided by the user system 102, then the certification server has determined either that the user system 102 on which the real time signature was generated is not identical to the user system 102 on which the original digital signature was generated, or that the user identity code entered by the user for the current transaction does not match the user identity code entered by the user at the time of original account establishment. Either conclusion increases the likelihood that the current user is an impostor. According to an aspect of the invention, however, some flexibility can be applied to the determination of whether the user system 102 is the same system on which the original digital signature was generated, allowing for a certain amount component upgrade drift FIG. 7 is a detail of the decision step 338 in FIG. 3B, which accommodates such flexibility In one such embodiment, the algorithms used to generate the original and real time signatures involve combining undigested individual system component data prior to digesting. At the time of account establishment, in addition to providing the original signature to the certification server 104, the user system 102 also digests individually the component data that was used to generate the original signature, and provides these individual component digests, together with the user's PIN, to the certification server 104 for storage on the signature database 108 in conjunction with the original digital signature. The individual component signatures actually can be digested prior to combining in the generation of the original signature, but in order to minimize the risk from unauthorized access to the signature database 108, the digesting algorithm used to provide the individual component digests to be stored on the signature database 108 should be such that they cannot be used to recreate the original USS.

Referring to FIG. 7, in step 710, the certification server 104 determines whether the original signature and challenge code combination is exactly equal to the real time signature provided through the merchant server 106. If so, then the certification result is positive (step 712). If not, then in step 714, the certification server determines whether the USS was based on a component having external assurances of substantial uniqueness. If so, then no drift is permitted in such a component and the certification result is negative (step 716).

In step 718, if the original signature and challenge code combination is not exactly equal to the real time signature, and individual user system component signatures were used to generate a USS, then in step 718, the certification server 104 requests the individual user system component signatures as they presently exist, from the user system 102 via the merchant 106. In step 720, the user system 102 provides such information via the merchant 106 in the same individually digested form with which they were originally provided and stored on the signature database 108. In step 722, the certification server 104 compares the individually digested real time user system component signatures, newly received, to the individually digested user system component signatures previously stored in the signature database.

In step 724, the certification server 104 determines whether the difference exceeds some predetermined threshold specified, for example, as a number of component signatures which are permitted to have changed If the differences do not exceed the designated threshold, then automatic reauthorization is performed (step 1000). If the differences does exceed the predetermined thresholds then the certification result is negative (step 728).

Figure 8:
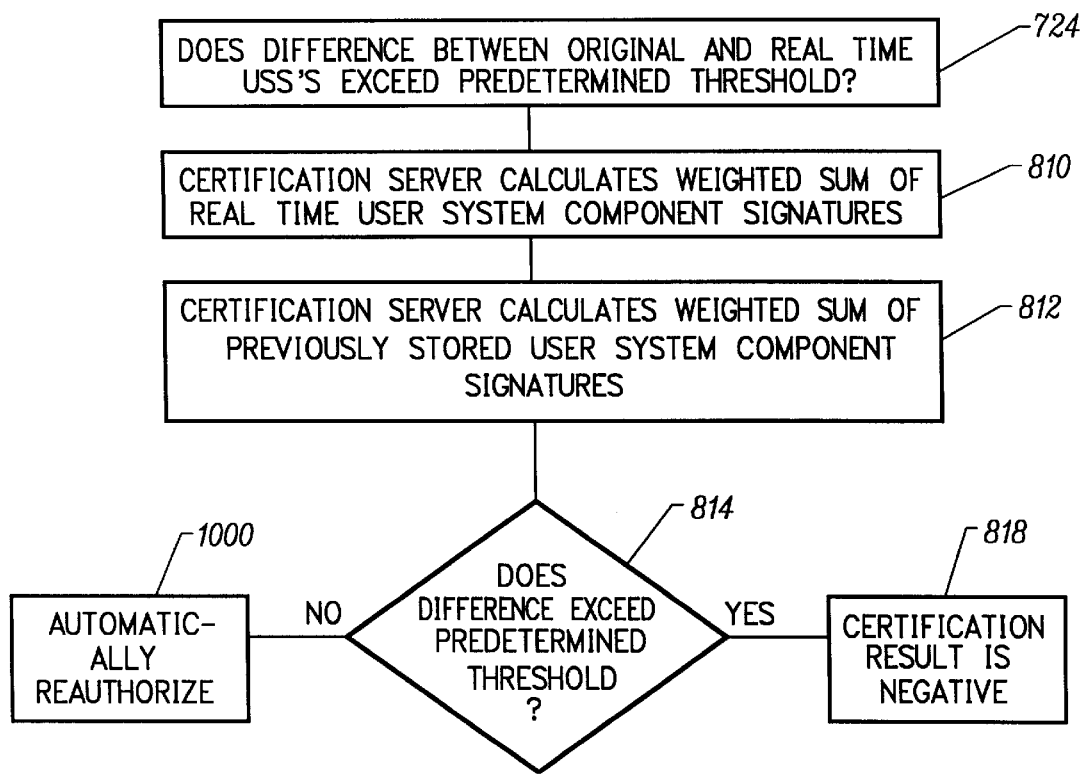
FIGS. 8 and 9 are alternative details of step 724 in FIG. 7.

FIG. 8 is a detail of step 724 (FIG. 7) in which the certification server 104 determines whether the difference between the two sets of individual component signatures exceeds the predetermined threshold. The flow chart set forth in FIG. 8 represents one embodiment in which the threshold is specified as a percentage. In a step 810, the certification server 104 calculates the weighted sum of the real time user system component signatures. In step 812, the certification server calculates the weighted sum of user system component signatures as previously stored in signature database 108. In step 814, the certification server 104 determines whether the difference between the two calculated values exceeds the predetermined percentage threshold. If not, then automatic reauthorization is permitted (step 1000) If so, then the certification result is negative (step 818).

Figure 9:
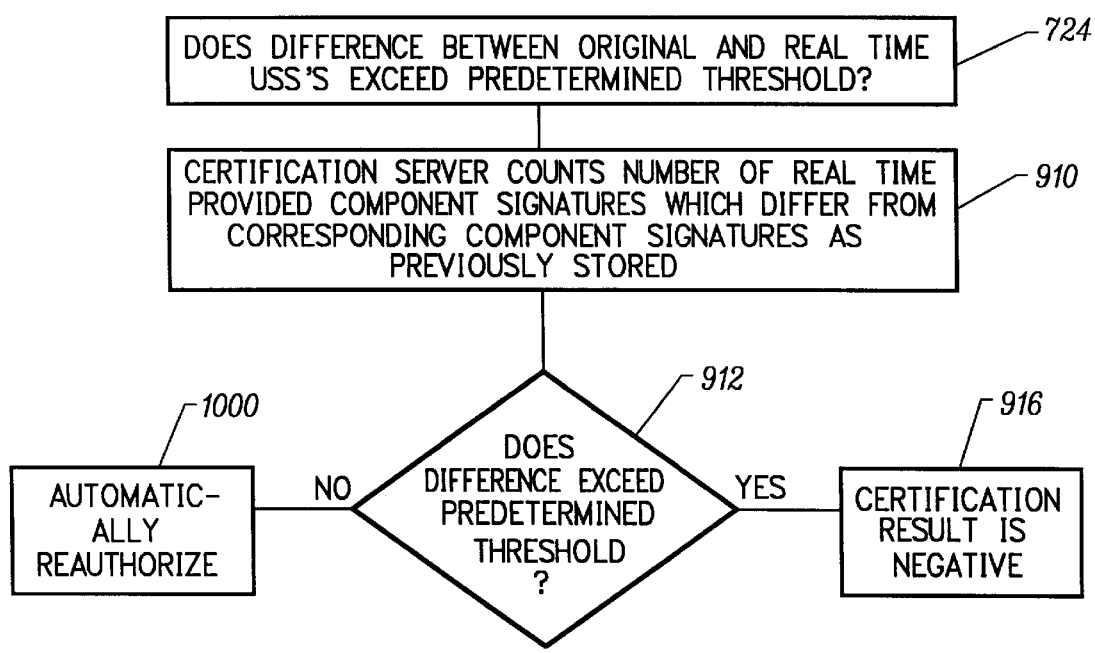

FIG. 9 is a detail of step 724 (FIG. 7) as performed in a second embodiment, in which the maximum upgrade drift flexibility is specified as a maximum number of components whose individual component signatures are permitted to have changed. In a step 910, the certification server counts the number of real time provided component signatures which differ from the corresponding component signatures as previously stored. In step 912, the certification server determines whether the count exceeds the predetermined threshold. If not, then automatic reauthorization is permitted (step 1000). If so, then the certification result is negative (step 916).

Figure 10:
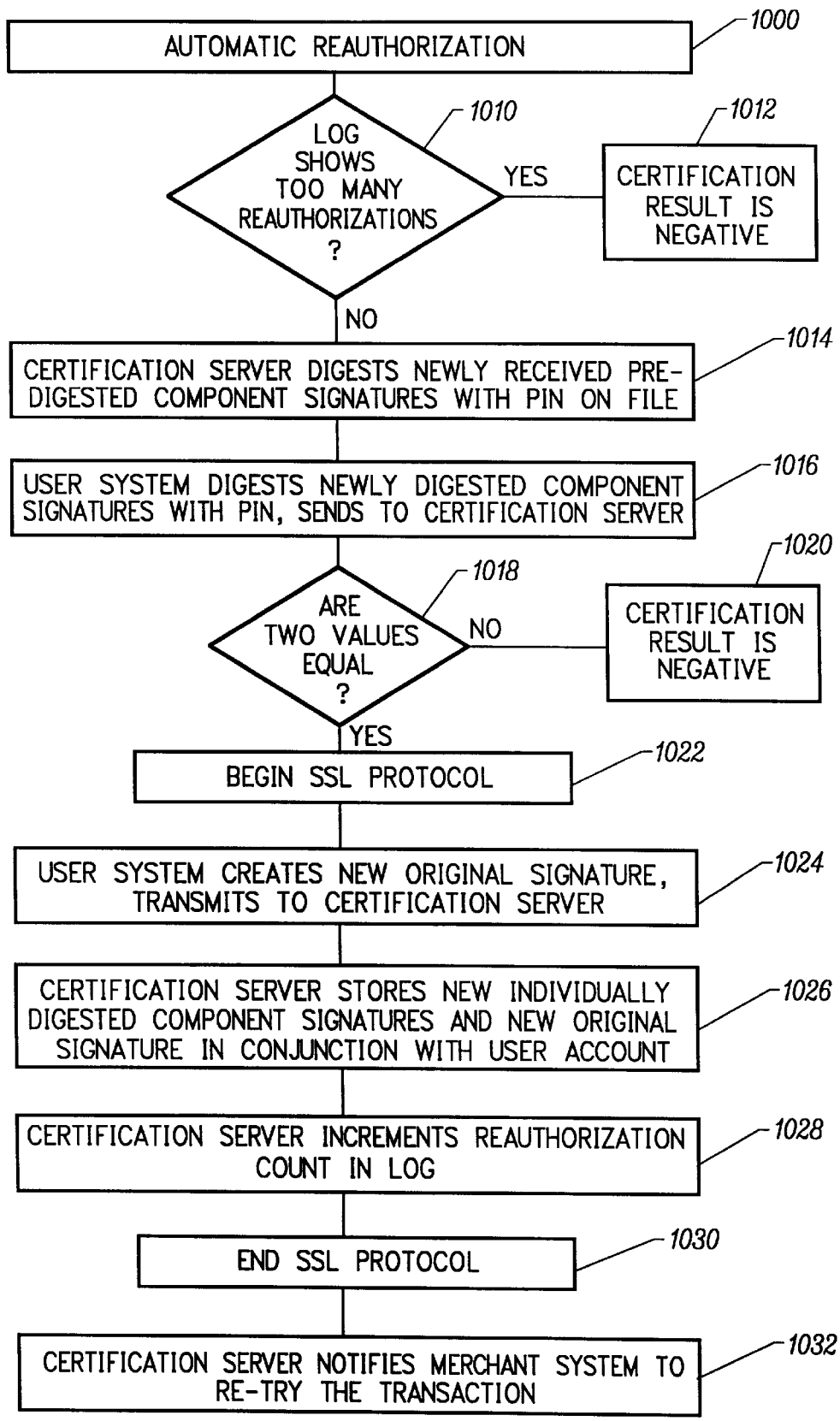
FIG. 10 is a detail of step 1000 in FIGS. 7, 8 and 9.

FIG. 10 is a flow chart detail of step 1000 (FIGS. 7, 8 and 9). In step 1010, the certification server 104 checks its log to determine whether the user's user identity has received more than a predetermined number of automatic reauthorizations. If so, then the certification result is negative (step 1012) and reauthorization must take place manually. If not, then in step 1014, the certification server digests the newly received predigested component signatures with the user's PIN already on file in the signature database 108. In response to a request by the certification server 104, the user system also digests its newly digested component signatures with the user's PIN, and transmits the result back to the certification server 104 (step 1016). In step 1018, the certification server 104 determines whether the two values are equal. If not, then in step 1020, the certification result is negative and automatic reauthorization is aborted.

If the two numbers are equal, then automatic reauthorization was successful. In order to update the signature database 108, the channel between the user system 102 and a certification server 104 optionally now begins using a secure socket layer (SSL) (step 1022). In step 1024, the user system 102 creates a new original digital signature, using the undigested individual component signatures and the user's PIN, and transmits the result to the certification server 104. In step 1026, the certification server 104 stores the new individually digested component signatures, as well as the new original signature received from step 1024, in conjunction with the user account. In step 1028, the certification server 104 increments the reauthorization count in its log, and in step 1030, the communication channel between user system 102 and certification server 104 exits the SSL protocol. Now that reauthorization has taken place, in step 1032, the certification server notifies the merchant system 106 to retry the transaction. Control then returns to step 324 (FIG. 3A) for the issuance of a new challenge code to the user system 102.

As used herein, steps which take place "in response to" a predecessor event, do so if the predecessor event influenced the performance of such steps. If there is an intervening time period, the performance of the steps can still be considered "respons" to the predecessor event. If the performance of the steps depends on more than one predecessor event, then the steps are considered performed in response to each of the predecessor events.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, whereas the flowcharts described herein illustrate steps being performed in a particular sequence, it will be appreciated that in many instances the sequence of the steps can be reversed, or the steps can be performed in a pipelined, overlapping manner, or both, without departing from the scope of the invention The embodiments herein were chosen and described in order to best explain the principles of the invention and its practical application, thereby enabling others skilled in the art to understand the invention for various embodiments and with various modifications as are suited to the particular use contemplated It is intended that the scope of the invention be defined by the following claims and their equivalents

I claim:

1. A digital certification method, comprising the steps of:
   storing, at a first time, a first signature dependent upon a first user identity and a first user system in combination;
   generating, at a second time subsequent to said first time, a second signature dependent upon a second user identity and a second user system in combination; and
   certifying, in dependence upon said first and second signatures, whether the combination of said second user identity and said second user system match the combination of said first user identity and said first user system.

2. A method according to claim 1, wherein said step of scoring comprises the step of developing said first signature in dependence upon a first user identity code and in dependence further upon a first group of at least one component as present in said first user system at said first time.

3. A method according to claim 2, wherein said step of developing said first signature comprises the step of obtaining said first user identity code in response to user input.

4. A method according to claim 2, wherein said step of storing further comprises the step of storing said first signature accessibly to a certification server,
   and wherein said step of certifying comprises the step of said certification server developing a certification result in dependence upon said first and second signatures.

5. A method according to claim 1, wherein said second user system is said first user system.

6. A method according to claim 1, wherein said step of certifying comprises the step of certifying, in dependence upon said first and second signatures, whether the combination of said second user identity and said second user system match the combination of said first user identity and said first user system, and further that said second signature was generated at a time different from said first time.

7. A method according to claim 6, wherein said step of generating is performed in response to a challenge, wherein said second signature is further dependent upon said challenge, and wherein said step of certifying comprises the step of developing a certification result in dependence upon said first and second signatures and further in dependence upon said challenge.

8. A method according to claim 1, further comprising the step of providing a challenge code, wherein said second signature is further dependent upon said challenge code.

9. A method according to claim 8, wherein said step of certifying comprises the step of developing a certification result in dependence upon said first and second signatures and further in dependence upon said challenge code.

10. A method according to claim 9, wherein said step of storing a first signature comprises the step of storing said first signature accessibly to a certification server,
    wherein said step of providing a challenge code comprises the step of an inquiring system providing said challenge code to both said second user system and said certification server,
    wherein said step of generating a second signature comprises the step of said second user system generating said second signature, said second signature being provided to said certification server,
    and wherein said step of developing a certification result is performed by said certification server.

11. A method according to claim 10, wherein said step of certifying further comprises the step of providing said certification result to said inquiring system.

12. A method according to claim 1, wherein said step of storing a first signature comprises the step of storing said first signature accessibly to a certification server, and wherein said first user system comprises a first group of components, comprising the steps of:
    developing a first component signature of each respective component in said first group as present in said first user system at said first time; and
    storing said first component signatures accessibly to said certification server.

13. A method according to claim 12, wherein said second user system comprises a second group of components, wherein said first signature is different from said first component signatures, wherein said step of certifying comprises the step of said certification server determining, in dependence upon said first and second signatures, that the combination of said second user identity and said second user system does not match the combination of said first user identity and said first user system, further comprising the steps of:
    developing a second component signature of each respective component in said second group as present in said second user system at said second time; and
    said certification server comparing said second component signatures with said first component signatures to determine whether said first and second user systems satisfy predetermined drift criteria.

14. A method according to claim 13, wherein said step of comparing comprises the step of determining whether a count of the number of said second component signatures which differ from corresponding first component signatures exceeds a predetermined maximum drift number greater than zero.

15. A method according to claim 13, wherein said step of certifying further comprises the step of determining whether said second user identity code is equal to said first user identity code.

16. A digital certification method, comprising the steps of:
storing, accessibly to a certification server, a first signature of a first user identity on a first user system in dependence upon a first user identity code and in dependence further upon a first group of at least one component as present in said first user system at a first time;
at a second time subsequent to said first time, an inquiring system providing a challenge code to a second user system and said second user system developing a second signature in dependence upon a second user identity code and in dependence further upon a second group of at least one component as present in said second user system at said second time;
providing said challenge code and said second signature to said certification server; and
said certification server developing a certification result in dependence upon said second signature and a combination of said challenge code and said first signature.

17. A method according to claim 16, further comprising the step of communicating said certification result to said inquiring system.

18. A digital certification method, comprising the steps of:
forming, at a first time, a first signature dependent upon a first user identity and a first user system in combination;
providing said first signature to a certification server;
generating, in response to an inquiry from an inquiring system at a second time subsequent to said first time, a second signature dependent upon a second user identity and a second user system in combination; and
providing said second signature for comparison with said first signature.

19. A method according to claim 18, wherein said step of forming a first signature comprises the step of developing said first signature in dependence upon a first user identity code and in dependence further upon a first group of at least one component as present in said first user system at said first time.

20. A method according to claim 19, wherein said step of developing said first signature comprises the step of obtaining said first user identity code in response to user input.

21. A method according to claim 18, wherein said second use system is said first user system.

22. A method according to claim 18, wherein said second signature is further dependent upon said inquiry.

23. A method according to claim 18, wherein said second user system receives a challenge code in conjunction with said inquiry,
and wherein said second signature is further dependent upon said challenge code.

24. A method according to claim 18, wherein said first user system comprises a first group of components, comprising the steps of:
developing a first component signature of each respective component in said first group as present in said first user system at said first time; and
providing said first component signatures to said certification server.

25. A method according to claim 24, wherein said second user system comprises a second group of components, wherein said first signature is different from said first component signatures, and wherein the combination of said second user identity and said second user system does not match the combination of said first user identity and said first user system, further comprising the steps of:
developing a second component signature of each respective component in said second group as present in said second user system at said second time; and
providing said second component signatures for comparison with said first component signatures.

26. A digital certification method, comprising the steps of:
providing a challenge code to a user system in response to a request for authorization for said user system;
receiving a real time signature from said user system after said step of providing a challenge code;
providing said challenge code and said real time signature to a certification server; and
receiving a certification result from said certification server after said step of providing said challenge code and said real time signature to said certification server.

27. A method according to claim 26, wherein said real time signature is dependent upon a first user identity and said user system in combination.

28. A method according to claim 27, wherein said real time signature is further dependent upon said challenge code.

29. A digital certification method, comprising the steps of:
storing accessibly to a certification server, at a first time, a first signature dependent upon a first user identity and a first user system in combination;
receiving, at a second time subsequent to said first time, a second signature dependent upon a second user identity and a second user system in combination; and
certifying, in dependence upon said first and second signatures, whether the combination of said second user identity and said second user system match the combination of said first user identity and said first user system.

30. A method according to claim 29, wherein said second user system is said first user system.

31. A method according to claim 29, wherein said step of certifying comprises the step of certifying, in dependence upon said first and second signatures, whether the combination of said second user identity and said second user system match the combination of said first user identity and said first user system, and that said second signature was generated at a time different from said first time.

32. A method according to claim 29, further comprising the step of receiving, in conjunction with said step of receiving a second signature, a copy of a challenge code,
wherein said second signature is further dependent upon said challenge code.

33. A method according to claim 32, wherein said step of certifying comprises the step of developing a certification result in dependence upon said first and second signatures and further in dependence upon said challenge code.

34. A method according to claim 29, wherein said step of certifying further comprises the step of providing a certification result to an inquiring system.

35. A method according to claim 29, wherein said first user system comprises a first group of components, comprising the steps of:
receiving a first component signature of each respective component in said first group as present in said first user system at said first time; and storing said first component signatures accessibly to said certification server.

36. A method according to claim 35, wherein said second user system comprises a second group of components, wherein said first signature is different from said first component signatures, wherein said step of certifying comprises the step of said certification server determining, in dependence upon said first and second signatures, that the combination of said second user identity and said second user system does not match the combination of said first user identity and said first user system, further comprising the steps of:

receiving a second component signature of each respective component in said second group as present in said second user system at said second time; and said certification server comparing said second component signatures with said first component signatures to determine whether said first and second user systems satisfy predetermined drift criteria.

37. A method according to claim 36, wherein said step of comparing comprises the step of determining whether a count of the number of said second component signatures which differ from corresponding first component signatures exceeds a predetermined maximum drift number greater than zero.

38. A method according to claim 36, wherein said step of certifying further comprises the step of determining whether said second user identity code is equal to said first user identity code.

\* \* \* \* \*